«12» United States Patent
Case, Jr. et al.

«10» Patent No.: US 9,904,634 B2
«45» Date of Patent: Feb. 27, 2018

«54» INPUT SIGNAL EMULATION

«71» Applicant: MICROSOFT TECHNOLOGY LICENSING, LLC, Redmond, WA (US)

«72» Inventors: Charles Whipple Case, Jr., Lake Oswego, OR (US); Philip Lindsley Davidson, Seattle, WA (US); Nathan James Fish, Seattle, WA (US); Michael C. Hilsdale, Issaquah, WA (US); Aaron William LeClaire, Portland, OR (US); Robert Philip Williams, Salem, OR (US)

«73» Assignee: Microsoft Technology Licensing, LLC, Redmond, WA (US)

«*» Notice: Subject to any disclaimer, the term of this patent is extended or adjusted under 35 U.S.C. 154(b) by 420 days.

«21» Appl. No.: 14/516,781

«22» Filed: Oct. 17, 2014

«65» Prior Publication Data

US 2016/0110300 A1    Apr. 21, 2016

«51» Int. Cl.
*G06F 3/00*      (2006.01)
*G06F 13/12*     (2006.01)
(Continued)

«52» U.S. Cl.
CPC .......... *G06F 13/105* (2013.01); *G06F 1/1632* (2013.01); *G06F 3/1407* (2013.01);
(Continued)

«58» Field of Classification Search
CPC .... G06F 13/105; G06F 13/385; G06F 13/387; G06F 1/1632
(Continued)

«56» References Cited

U.S. PATENT DOCUMENTS 6,081,856 A * 6/2000 Comer ................... G06F 9/455
                                                                 703/24
6,895,588 B1    5/2005 Ruberg
(Continued)

FOREIGN PATENT DOCUMENTS

WO        2009012344 A2    1/2009

OTHER PUBLICATIONS

"International Search Report and Written Opinion Issued in PCT Application No. PCT/US2015/055195", dated Jan. 15, 2016, 10 Pages.
(Continued)

*Primary Examiner* — Farley Abad
*Assistant Examiner* — Getente A Yimer
«74» *Attorney, Agent, or Firm* — Workman Nydegger

«57» ABSTRACT

Input signals, received by a primary computer, are emulated to a guest computer. For example, an input redirection component is connected between the primary computer and the guest computer. The primary computer may be communicatively connected to an input device (e.g., a touch display, a keyboard, etc.). The guest computer may not, however, be communicatively connected to the input device, and thus may be unaware of input signals from the input device. Accordingly, the input redirection component may receive, from the primary computer, a message regarding an input signal from the input device. The input redirection component may emulate the input device (e.g., connect to the guest computer as though the input redirection component is the input device), and may provide an emulated input signal, emulating the input signal, to the guest computer (e.g., the input signal, received by the primary computer, may be used to control the guest computer).

19 Claims, 9 Drawing Sheets

(51) Int. Cl.
*G06F 13/38* (2006.01)
*G06F 13/10* (2006.01)
*G06F 3/14* (2006.01)
*G06F 1/16* (2006.01)
*G06F 9/44* (2018.01)
*G09G 5/14* (2006.01)

(52) U.S. Cl.
CPC .......... *G06F 3/1438* (2013.01); *G06F 3/1454* (2013.01); *G06F 9/4445* (2013.01); *G06F 13/385* (2013.01); *G06F 13/387* (2013.01); *G09G 5/14* (2013.01); *G09G 2354/00* (2013.01); *G09G 2370/022* (2013.01); *G09G 2370/042* (2013.01); *G09G 2370/12* (2013.01); *G09G 2370/24* (2013.01)

(58) Field of Classification Search
USPC .................................. 710/10, 30, 63, 73, 316
See application file for complete search history.

(56) References Cited

U.S. PATENT DOCUMENTS

| | | | | |
|---|---|---|---|---|
| 2004/0049624 | A1* | 3/2004 | Salmonsen | G06F 13/40 710/306 |
| 2006/0015669 | A1* | 1/2006 | Engler | G06F 13/4045 710/300 |
| 2008/0126629 | A1* | 5/2008 | Huang | G06F 1/3203 710/64 |
| 2009/0094395 | A1* | 4/2009 | Shen | G06F 3/023 710/74 |
| 2009/0187687 | A1 | 7/2009 | Hulbert et al. | |
| 2012/0206372 | A1 | 8/2012 | Mundt et al. | |
| 2013/0219324 | A1 | 8/2013 | Seo et al. | |
| 2013/0252600 | A1 | 9/2013 | Seo | |
| 2014/0109091 | A1 | 4/2014 | Philipson et al. | |
| 2015/0356045 | A1* | 12/2015 | Soffer | G06F 13/4221 710/303 |

OTHER PUBLICATIONS

"International Preliminary Report on Patentability Issued in PCT Application No. PCT/US2015/055195", dated Sep. 29, 2016, 6 Pages.
"Connecting a SMART Board 600i Interactive Whiteboard System", Published on: Nov. 1, 2007, pp. 7 Available at: https://smarttech.com/ca/Support/Browse+Support/Support+Documents/KB1/115199.aspx.
"Human Interface Device Tutorial", Retrieved on: May 26, 2014, pp. 52 Available at: http://www.silabs.com/Support%20Documents/TechnicalDocs/AN249.pdf.
"Embedded USB—A Brief Tutorial", Published on: Jun. 17, 2007, pp. 8 Available at: http://www.computer-solutions.co.uk/info/Embedded_tutorials/usb_tutorial.htm.
"LPC2368 / LPC2378 USB HID (Human Interface Device) Example", Published on: Oct. 27, 2013, pp. 1 Available at: http://www.keil.com/download/docs/335.asp.

* cited by examiner

INPUT SIGNAL EMULATION

BACKGROUND

Many users may interact with various types of computing devices, such as laptops, tablets, personal computers, mobile phones, kiosks, videogame systems, etc. In an example, a user may utilize a mobile phone to obtain driving directions, through a map interface, to a destination. In another example, a user may utilize a store kiosk to print coupons and lookup inventory through a store user interface.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing emulated input signals to a guest computer are provided herein. In an example of providing an emulated input signal to a guest computer, an input redirection component comprises a first controller component and a second controller component. The first controller component is coupled to a primary computer by a first communication channel. The first controller component is coupled to the second controller component by a second communication channel. The primary computer is coupled to an input device. The first controller component is configured to receive a message, over the first communication channel, from the primary computer. The message indicates that an input signal, received by the primary computer from the input device, is to be forwarded to a guest computer, where the guest computer is not coupled to the input device. The first controller component is configured to relay the message, over the second communication channel, to the second controller component. The second controller component is coupled to the guest computer by a third communication channel. The second controller component is configured to generate an emulated input signal based upon the message that was relayed by the first controller component to the second controller component. The emulated input signal is formatted to appear as though the input signal originated from an emulated input device coupled to the guest computer over the third communication channel. The emulated input signal is provided, over the third communication channel, to the guest computer.

In an example of providing an emulated input signal to a guest computer, a first communication channel is established with an input device coupled to a primary computer. An input signal is received, over the first communication channel, from the input device. A second communication channel is established with an input redirection component. A message is sent, over the second communication channel, to the input redirection component. The message instructs the input redirection component to emulate the input device, to a guest computer, as an emulated input device. The message instructs the input redirection component to provide an emulated input signal, as an emulation of the input signal, to the guest computer over a third communication channel between the input redirection component and the guest computer.

In an example of providing an emulated input signal to a guest computer, a first communication channel is established with a primary computer coupled to an input redirection component. A second communication channel is established between the input redirection component and a guest computer. A message is received, over the first communication channel, from the primary computer. The message indicates that an input signal, received by the primary computer from an input device coupled to the primary computer, is to be forwarded to the guest computer. The guest computer is not coupled to the input device. An emulated input signal is generated based upon the message. The emulated input signal is formatted to appear as though the input signal originated from an emulated input device coupled to the guest computer. The emulated input signal is provided, over the second communication channel, to the guest computer.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
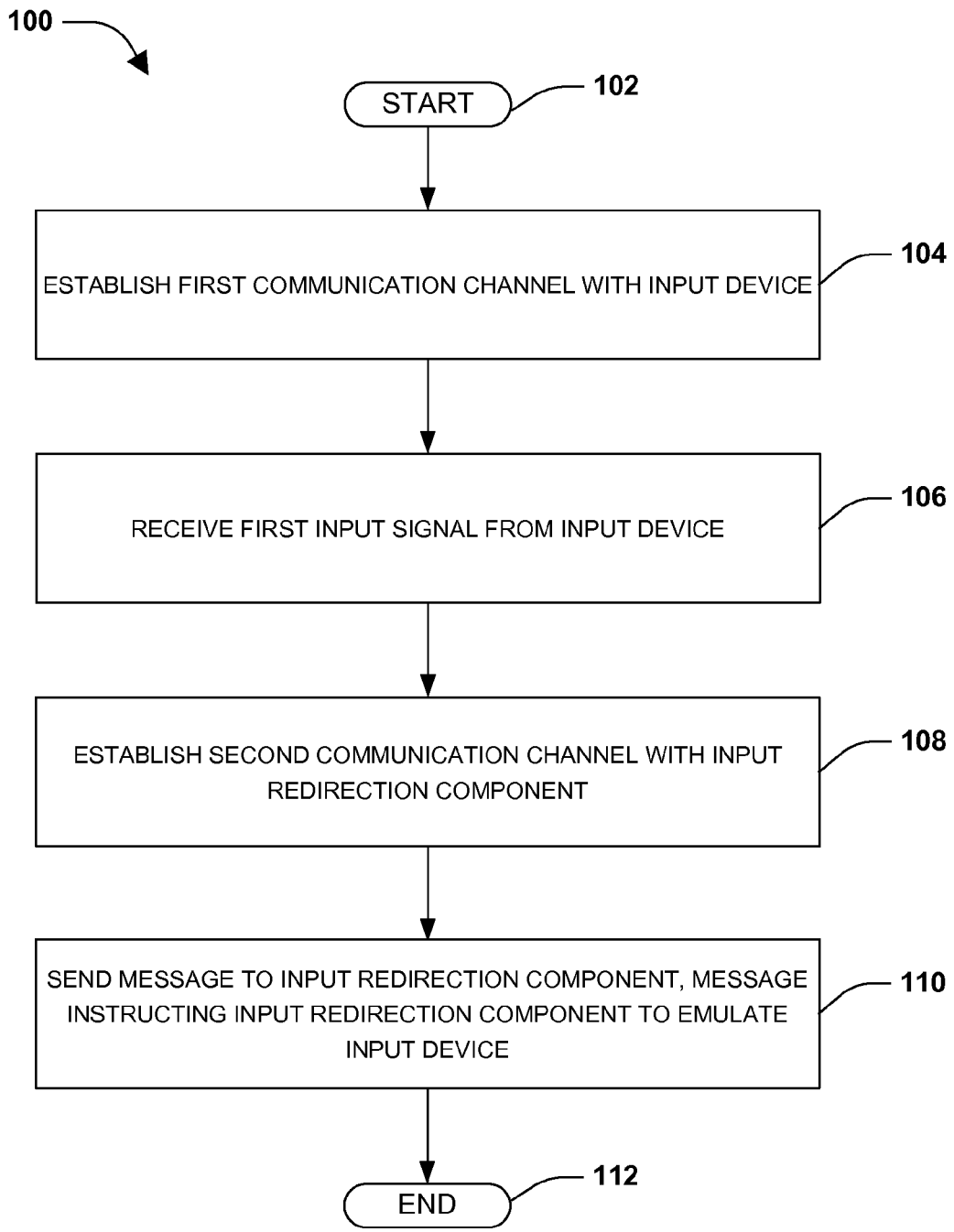
FIG. 1 is a flow diagram illustrating an exemplary method of providing emulated input signals to a guest computer.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for providing emulated input signals to a guest computer are provided herein. Users may desire to connect guest computers to primary computers such that input devices of the primary computers may be used to operate the guest computers. Accordingly, as provided herein, an input redirection component may be configured to receive a message from a primary computer about an input signal received from an input device (e.g., touch display) coupled to the primary computer but not coupled to a guest computer (e.g., the guest computer may be connected to the touch display by a video connection, but not by a connection that would allow the guest computer to receive input signals from the touch display). The input redirection component may be configured to generate an emulated input signal based upon the input signal, and to provide the emulated input signal to the guest computer (e.g., the emulated input signal may be formatted to appear to the guest computer as though it originated from an input device connected to the guest computer). In an example, the input redirection component may be integrated with a primary computer, and thus may mitigate guest computer memory and/or processor utilization, and the need for customized software on a guest computer. In another example, the input redirection component may be separate from a primary computer and/or a guest computer (e.g., the input redirection component may be connected to the primary computer by a first connection, such as a first universal serial bus (USB) connection or other connection type such as a first wireless communication connection, and may be connected to the guest computer by a second connection such as a second USB connection or other connection type such as a second wireless communication connection).

An embodiment of providing emulated input signals to a guest computer is illustrated by an exemplary method 100 of FIG. 1. At 102, the method starts. At 104, a first communication channel may be established with an input device coupled to a primary computer. In an example, the input device may comprise a stylus, a touch device, a touch display, a keyboard, a mouse, a camera, and/or any other type of input device. The primary computer may be coupled to the input device by various types of connections, such as a wired connection, a wireless connection, a USB connection, an interconnect structure (e.g., a touch display may be hardwired to an embedded primary computer by a copper wire, a metal trace, and/or other connectivity structure), etc. In an example, the first communication channel may comprise a bi-directional communication channel.

In an example, the primary computer may display a primary interface (e.g., a desktop environment of the primary computer) on a display, such as a touch display. The primary computer may define a guest display region for displaying a guest interface of the guest computer (e.g., the guest computer may be connected to the primary computer and/or the touch display by a video connection). The guest display region and the primary display region may be displayed concurrently (e.g., the guest display region and/or the primary display region may be resized, moved, and/or modified by the primary computer). A video signal, received by the guest computer, may be formatted for the guest display region to create the guest interface for display through the touch display. In this way, the primary computer may display video output from the primary computer, through the primary interface, and video output from the guest computer through the guest interface. Because interaction with the touch display and/or input signals from other input devices (e.g., a mouse, stylus, etc.) connected to the primary computer may not be provided back to the guest computer, emulated input signals may be provided to the guest computer.

At 106, an input signal may be received, over the first communication channel, from the input device. For example, the input signal may correspond to a touch gesture on the touch display. In an example, the input signal may be distinguished as being associated with the guest interface (e.g., display of the guest operating system of the guest computer) and not the primary interface of the primary computer. At 108, a second communication channel may be established with an input redirection component. For example, the primary computer may be connected to a first controller component of the input redirection component by the second communication channel (e.g., a wired connection, a wireless connection, a USB connection, an interconnection structure, etc.). In an example, the second communication channel may comprise a bi-directional communication channel. In an example, the first controller component may comprise primary host firmware configured to communicate with the primary computer. In an example, the first controller component may be connected to a second controller component of the input redirection component (e.g., by a serial peripheral interface (SPI) connection). The second controller component may comprise guest firmware configured to communicate with the guest computer over a third communication channel between the input redirection component and the guest computer. In an example, the third communication channel may comprise a bi-directional communication channel.

At 110, a message may be sent, over the second communication channel such as by the primary computer, to the input redirection component. The message may instruct the input redirection component to emulate the input device, to the guest computer, as an emulated input device. In an example, the guest firmware may be configured to "handshake" and connect with the guest computer as though (e.g., under the false impression that) the second controller component is the input device, such as the touch display. For example, a device type of the input device may be identified (e.g., a touch display device type). The second controller component may connect to the guest computer as an emulation of the device type to appear to the guest computer as the emulated input device (e.g., to appear to the guest computer as a touch display that is connected to the guest computer by the third communication channel). The message may instruct the input redirection component to provide an emulated input signal, as an emulation of the input signal, to the guest computer over the third communication channel. For example, the second controller component may generate the emulated input signal as an emulated signal appearing to have originated from a USB human interface device (HID) or other type of input device (e.g., a touch display connected to the guest computer through a USB HID connection, a wireless communication device, a wired communication device, etc.). The second controller component, such as the guest firmware, may provide the emulated input signal to a device driver (e.g., a USB HID device driver) hosted on the guest computer. In this way, the emulated signal (e.g., an emulation of the touch gesture on the touch display) may be provided to the guest computer.

In an example of providing an emulation of a virtualized input signal, a virtualized input signal may be received from an application associated with the primary computer. The virtualized input signal may correspond to a virtualized input device emulated by the application. For example, the application, such as a script, may generate a series of keystrokes as the virtualized input signal. A second message may be sent, over the second communication channel, to the input redirection component. The second message may instruct the input redirection component (e.g., the second controller component) to emulate the virtualized input device, to the guest computer, as an emulated virtualized input device. For example, the guest firmware, of the second controller component, may be configured to "handshake" and connect with the guest computer as though (e.g., under the false impression that) the second controller component is a keyboard. The second message may instruct the input redirection component to provide an emulated virtualized input signal, as an emulation of the virtualized input signal, to the guest computer over the third communication channel (e.g., the series of keystrokes may be provided by the second controller component to the guest computer as though the second controller component was a keyboard that received the series of keystrokes from a user). In this way, emulations of virtualized input signals may be provided to the guest computer.

In an example where the first communication channel, the second communication channel, and/or the third communication channel are bi-directional communication channels, the guest computer may send a command (e.g., back) through the input redirection component and the primary computer to the input device. For example, the user may click a Caps Lock key on a keyboard input device connected to the primary computer, which may be emulated to the guest computer. The guest computer may send a command back to the keyboard input device to turn a Caps Lock LED on or off. At 112, the method ends.

Figure 2:
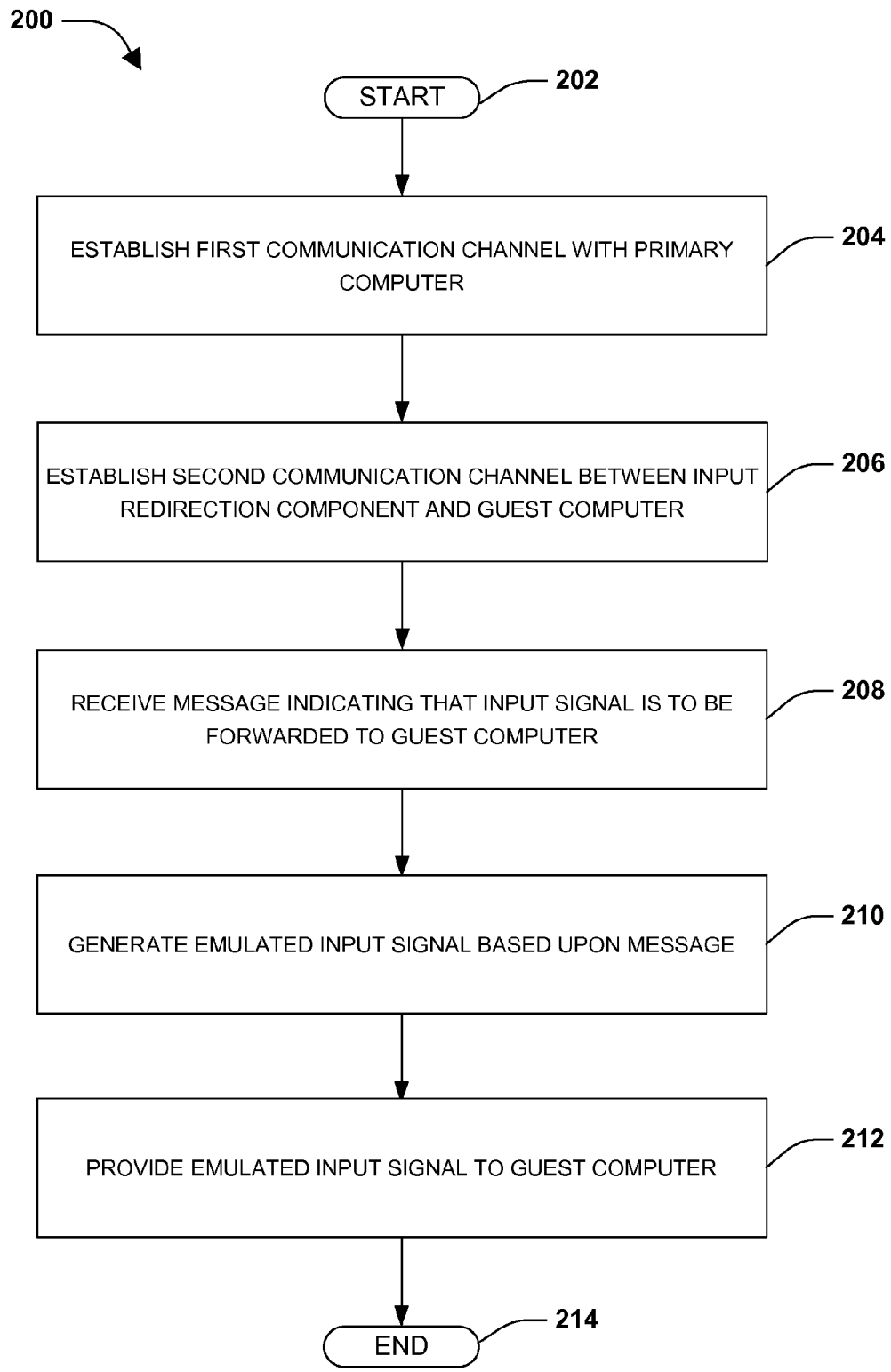
FIG. 2 is a flow diagram illustrating an exemplary method of providing emulated input signals to a guest computer.

An embodiment of providing emulated input signals to a guest computer is illustrated by an exemplary method 200 of FIG. 2. At 202, the method starts. At 204, a first communication channel may be established with a primary computer coupled to an input redirection component (e.g., a first controller component, of the input redirection component, may establish the first communication channel over a first connection, such as a first USB HID connection). At 206, a second communication channel may be established between the input redirection component and a guest computer (e.g., a second controller component, of the input redirection component, may establish the second communication channel over a second connection, such as a second USB HID connection). In an example, the first controller component may be connected to the second controller component, such as by an SPI connection.

At 208, a message may be received, over the first communication channel, from the primary computer (e.g., primary host firmware of the first controller component may receive the message). The message may indicate that an input signal, received by the primary computer from an input device coupled to the primary computer, is to be forwarded to the guest computer. For example, the message may indicate that the primary computer received a mouse click from a mouse connected to the primary computer. The guest computer may not be coupled to the input device (e.g., the mouse may not be connected to the guest computer).

At 210, an emulated input signal may be generated based upon the message. The emulated input signal may be formatted to appear as though the input signal originated from an emulated input device coupled to the guest computer (e.g., guest firmware of the second controller component may present itself to the guest computer as a mouse). In an example, a device type of the input device may be identified (e.g., a mouse device type), and the second controller component may connect as an emulation of the device type to appear as the emulated input device. In an example, the emulated input signal may be generated as an emulated signal appearing to have originated from a USB HID device or other type of device connected to the guest computer. At 212, the emulated input signal may be provided, over the second communication channel, to the guest computer. For example, the emulated input signal may be provided to a device driver (e.g., a USB HID device driver) hosted on the guest computer. In this way, the input redirection component may provide emulated input signals to the guest computer. At 214, the method ends.

Figure 3:
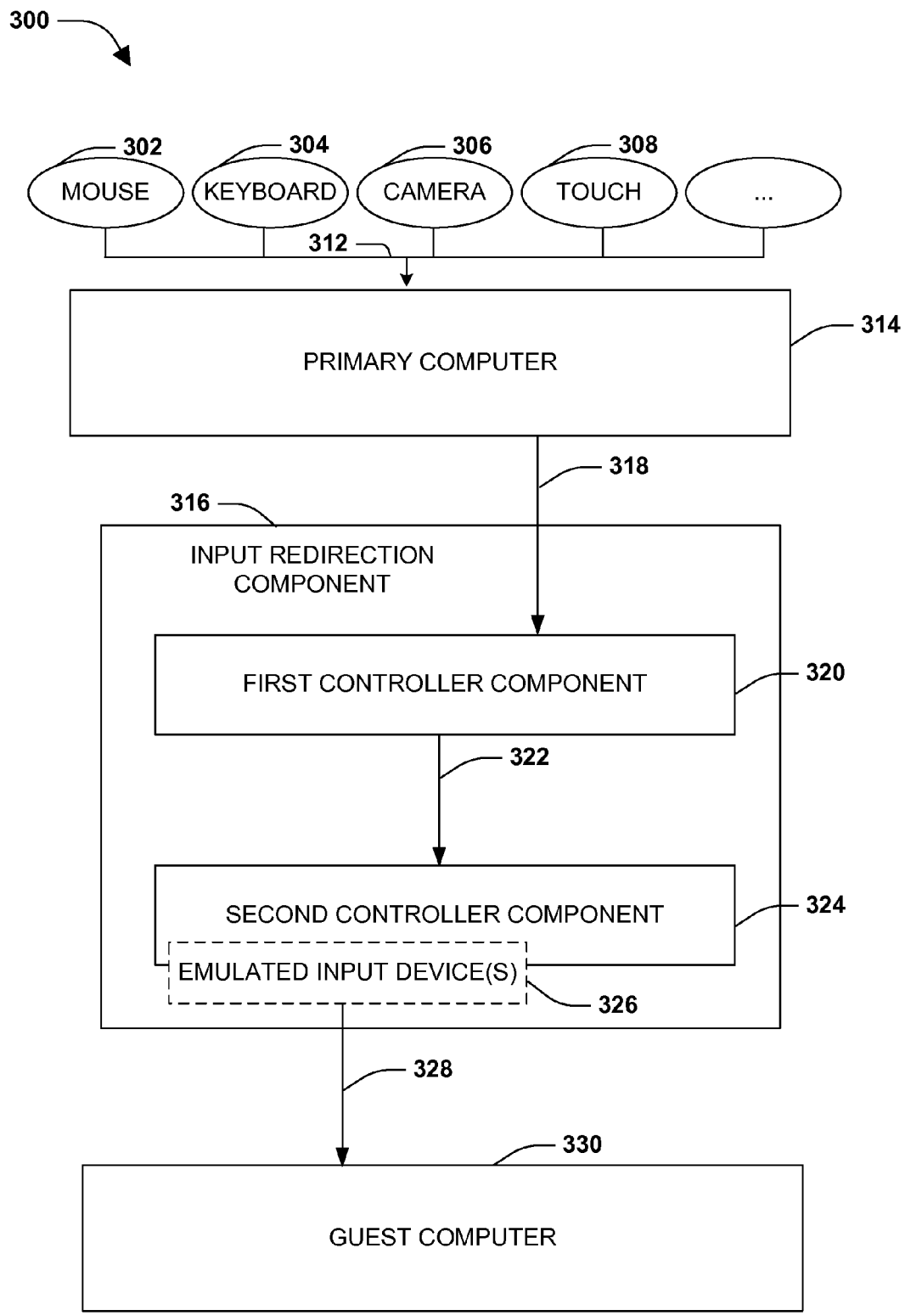
FIG. 3 is a component block diagram illustrating an exemplary system for providing emulated input signals to a guest computer.

FIG. 3 illustrates an example of a system 300 for providing emulated input signals to a guest computer 330. The system 300 comprises an input redirection component 316. The input redirection component 316 comprises a first controller component 320 coupled to a primary computer 314 by a first communication channel 318. The primary computer 314 may comprise an embedded computer (e.g., within a touch display), a videogame console, a tablet, a laptop, a mobile device, a wearable device (e.g., glasses, a watch, etc.), a personal computer, a kiosk, etc. The first controller component 320 may be coupled to a second controller component 324, of the input redirection component 316, by a second communication channel 322. The primary computer 314 may be coupled to an input device, such as a mouse 302, a keyboard 304, a camera 306, a touch device 308, a stylus, a storage device (e.g., a USB flash drive, a hard drive, etc.), or any other input device, by a communication channel 312. The guest computer 330 may not be coupled to the input device (e.g., the guest computer 330 may be connected to a touch display by a video connection, but not by a connection that would allow the guest computer 330 to receive input signals from the input device), and thus the input device may not be identifiable (e.g., by a device driver of the guest computer 330). In an example, the input redirection component 316 may be implemented as a single hardware component that is interconnected between multiple computers, such as the primary computer and the guest computer (e.g., the input redirection component 316 may comprise a standalone plug and play device).

The first controller component 320 may be configured to receive a message, over the first communication channel 318, from the primary computer 314 (e.g., primary host firmware of the first controller component 320 may receive the message). The message may indicate that an input signal, received by the primary computer 320 from the input device, is to be forwarded to the guest computer 330. For example, the input signal may comprise a mouse click input signal from the mouse 302. The first controller component 320 may relay the message, over the second communication channel 322, to the second controller component 324 (e.g., the message may be relayed to guest firmware of the second controller component 324).

The second controller component 324 may identify a device type of the input device, such as a mouse device type of the mouse 302, based upon the message. The second controller component 324 may connect to the guest computer 330 as an emulation of the device type to appear as an emulated input device 326, such as an emulation of a mouse that appears to the guest computer 330 as being connected to the guest computer 330 over a third connection 328 between the second controller component 324 and the guest computer 330. The second controller component 324 may be configured to generate an emulated input signal based upon the message. The emulated input signal may be formatted to appear as though the input signal originated from the emulated input device (e.g., as though the second controller component 324 was a mouse that created the mouse click input signal). In an example, the emulated input signal may be generated as an emulated signal appearing to have originated from a USB HID device, and may be provided to a USB HID device driver hosted on the guest computer 330. In this way, the emulated input signal of the mouse click may be provided, over the third communication channel 328, to the guest computer 330.

Figure 4A:
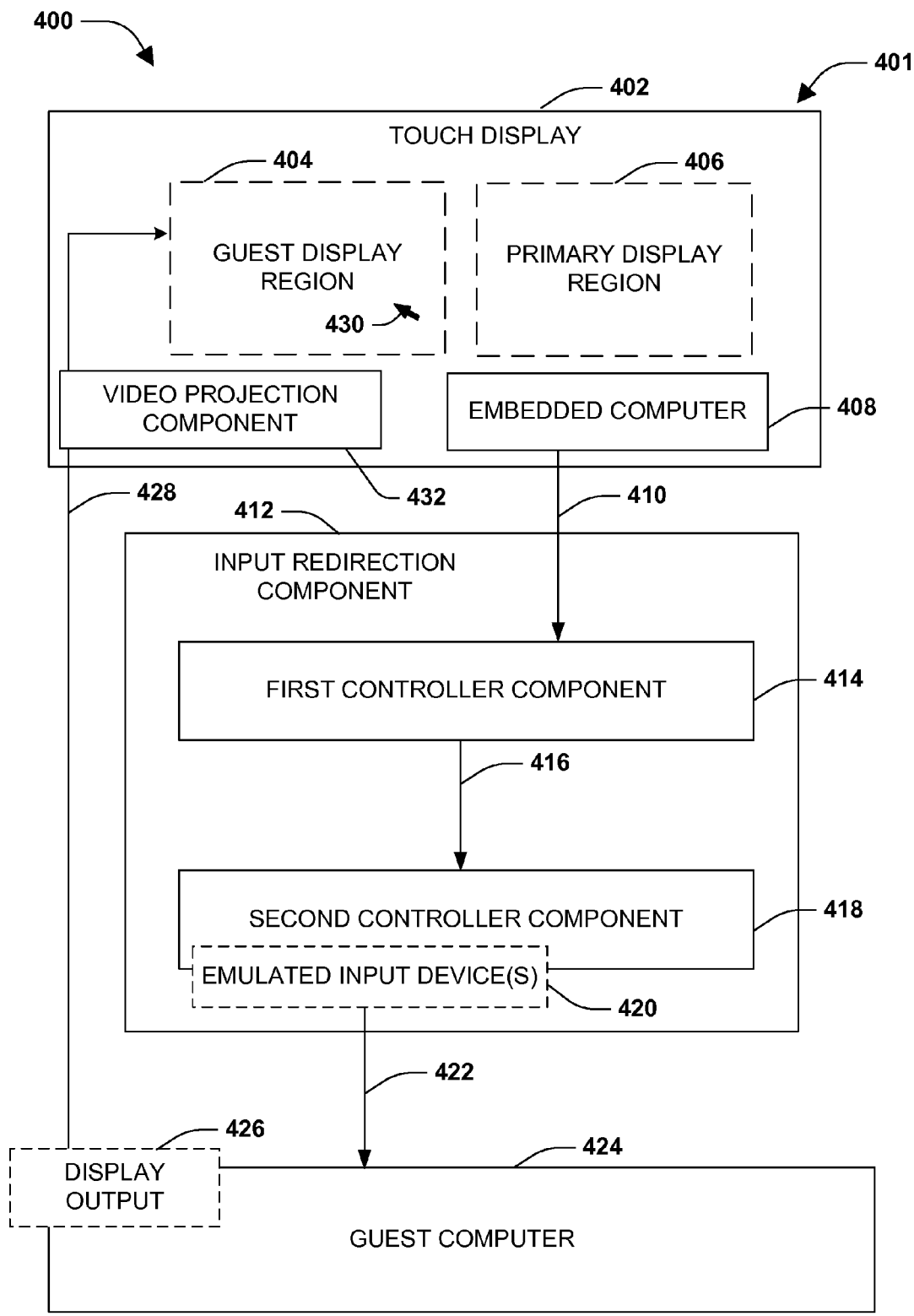
FIG. 4A is a component block diagram illustrating an exemplary system for providing emulated input signals to a guest computer based upon an input signal associated with a guest display region.
Figure 4B:
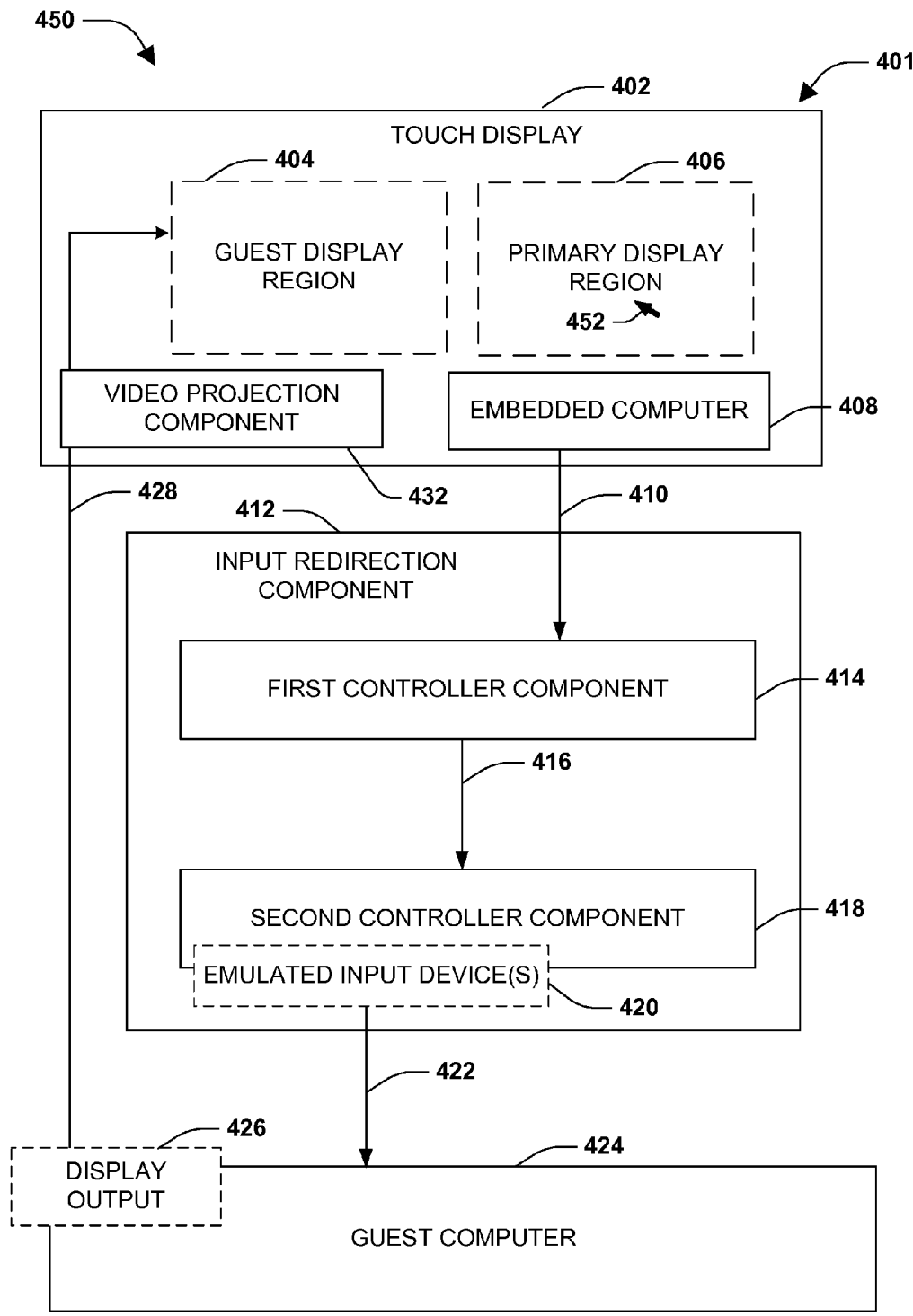
FIG. 4B is a component block diagram illustrating an exemplary system for providing emulated input signals to a guest computer, where an input signal is determined to be associated with a primary display region and not a guest display region.
Figure 4C:
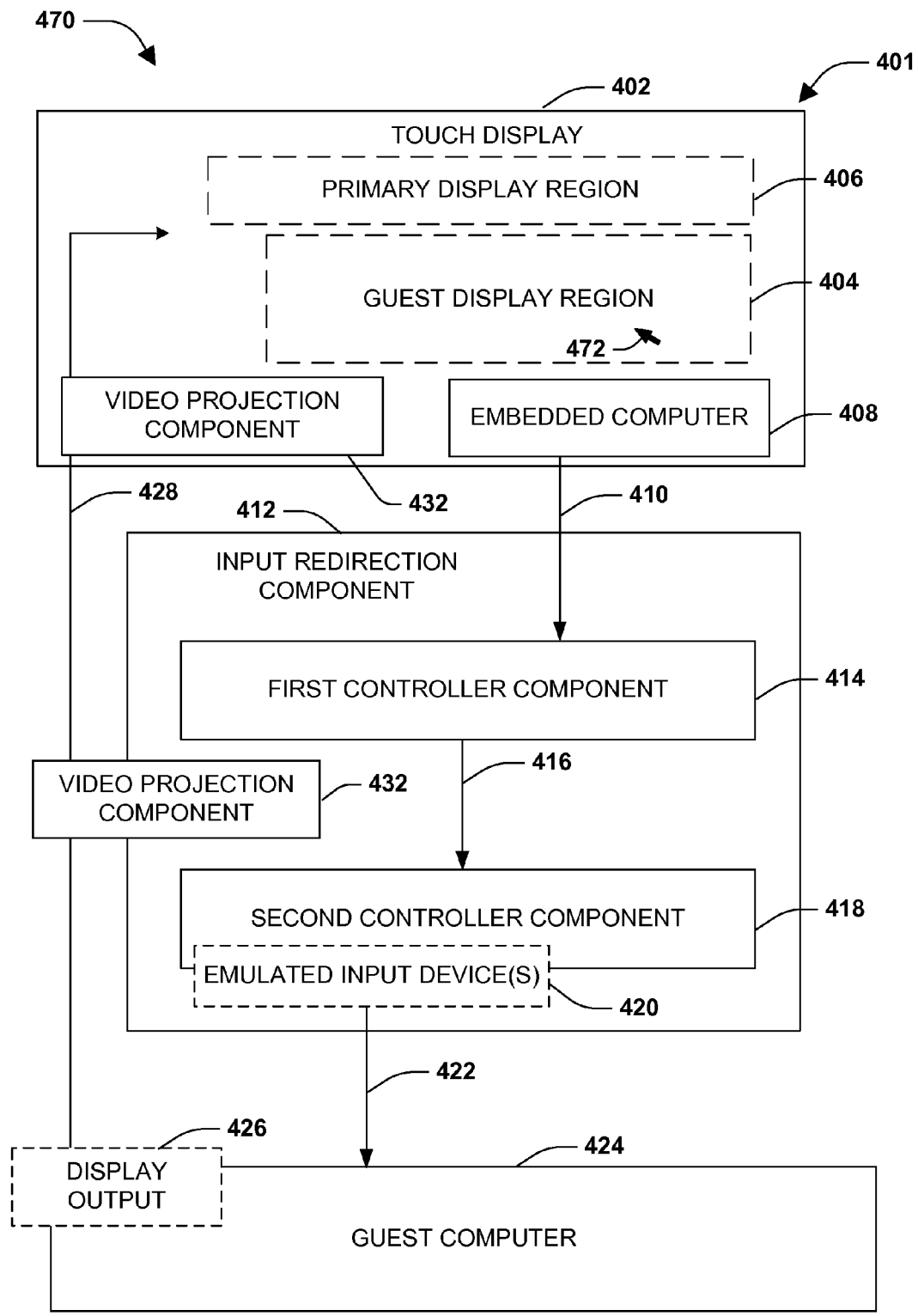
FIG. 4C is a component block diagram illustrating an exemplary system for providing emulated input signals to a guest computer based upon an input signal associated with a guest display region.

FIGS. 4A-4C illustrate examples of a system 401, comprising an input redirection component 412, for providing emulated input signals to a guest computer 424. FIG. 4A illustrates an example 400 of the input redirection component 412 comprising a first controller component 414 coupled to a primary computer, such as an embedded computer 408 of a touch display input device 402, by a first communication channel 410. The first controller component 414 may be coupled to a second controller component 418, of the input redirection component 412, by a second communication channel 416. The embedded computer 408 may be coupled to (e.g., embedded within) the touch display input device 402. Input signals may be generated by the touch display input device 402 based upon user interaction with the touch display input device 402. The guest computer 424 may not be coupled to the touch display input device 402 by a communication channel that allows the touch display input device 402 to directly provide input signals to the guest computer 424 (e.g., a video communication channel 428 may correspond to a video cable, such as an HDMI cable connected to a display output port 426 of the guest computer 424, that does not support the touch display input device 402 sending touch input signals to the guest computer 424).

In an example, the guest computer 424 may connect to a video projection component 432, associated with the touch display input device 402, using the video communication channel 428. The video projection component 432 may define a guest display region 404 (e.g., through which the guest computer 424 may project a desktop computing environment or other video output) on the touch display input device 402. The video projection component 432 may be configured to receive a video signal from the guest computer 424. The video projection component 432 may format the video signal for the guest display region 404 to create a guest interface. The guest interface may be displayed through the guest display region 404. The video projection component 432 may define a primary display region 406 (e.g., through which the embedded computer 408 may display video output such as a touch display computing environment) on the touch display input device 402. The video projection component 432 may display a primary interface, associated with the embedded computer 408, through the primary display region 406. In an example, the video projection component 432 may move, resize, hide, and/or modify the display of the guest display region 404 and/or the primary display region 406 (e.g., responsive to user touch gestures on the touch display input device 402).

The video projection component 432 may be configured to determine whether input of the touch display input device 402 corresponds to the guest display region 404 or the primary display region 406. FIG. 4A illustrates the example 400 of the video projection component 432 determining that input 430 corresponds to the guest display region 404 and not the primary display region 406. FIG. 4B illustrates an example 450 of the video projection component 432 determining that input 452 corresponds to the primary display region 406 and not the guest display region 404. FIG. 4C illustrates an example 470 where the video projection component 432 modifies a size and location of the primary display region 406 and the guest display region 404 (e.g., a user may utilize touch gestures to move and/or resize display regions). The video projection component 432 may determine that input 472 corresponds to the guest display region 404 and not the primary display region 406 (e.g., even though the input 472 pertains to pixels formerly within the primary display region). In this way, an input signal, associated with the guest display region, may be identified.

The first controller component 414 may be configured to receive a message, over the first communication channel 410, from the embedded computer 408. The message may indicate that an input signal (e.g., a touch gesture), received by the embedded computer 408 from the touch display input device 402, is to be forwarded to the guest computer 424. The first controller component 414 may relay the message, over the second communication channel 416, to the second controller component 418.

The second controller component 418 may identify a device type of the input device, such as a touch display device type of the touch display input device 402, based upon the message. The second controller component 418 may connect to the guest computer 424 as an emulation of the device type to appear as an emulated input device 420, such as an emulation of a touch display input device that appears to the guest computer 424 as being connected to the guest computer 424 over a third communication channel 422 between the second controller component 418 and the guest computer 424. The second controller component 418 may be configured to generate an emulated input signal based upon the message. The emulated input signal may be formatted to appear as though the input signal originated from the emulated input device 420 (e.g., as though the second controller component 418 was a touch display that created the touch gesture). In this way, the emulated input signal of the touch gesture may be provided, over the third communication channel 422, to the guest computer 424.

Figure 5:
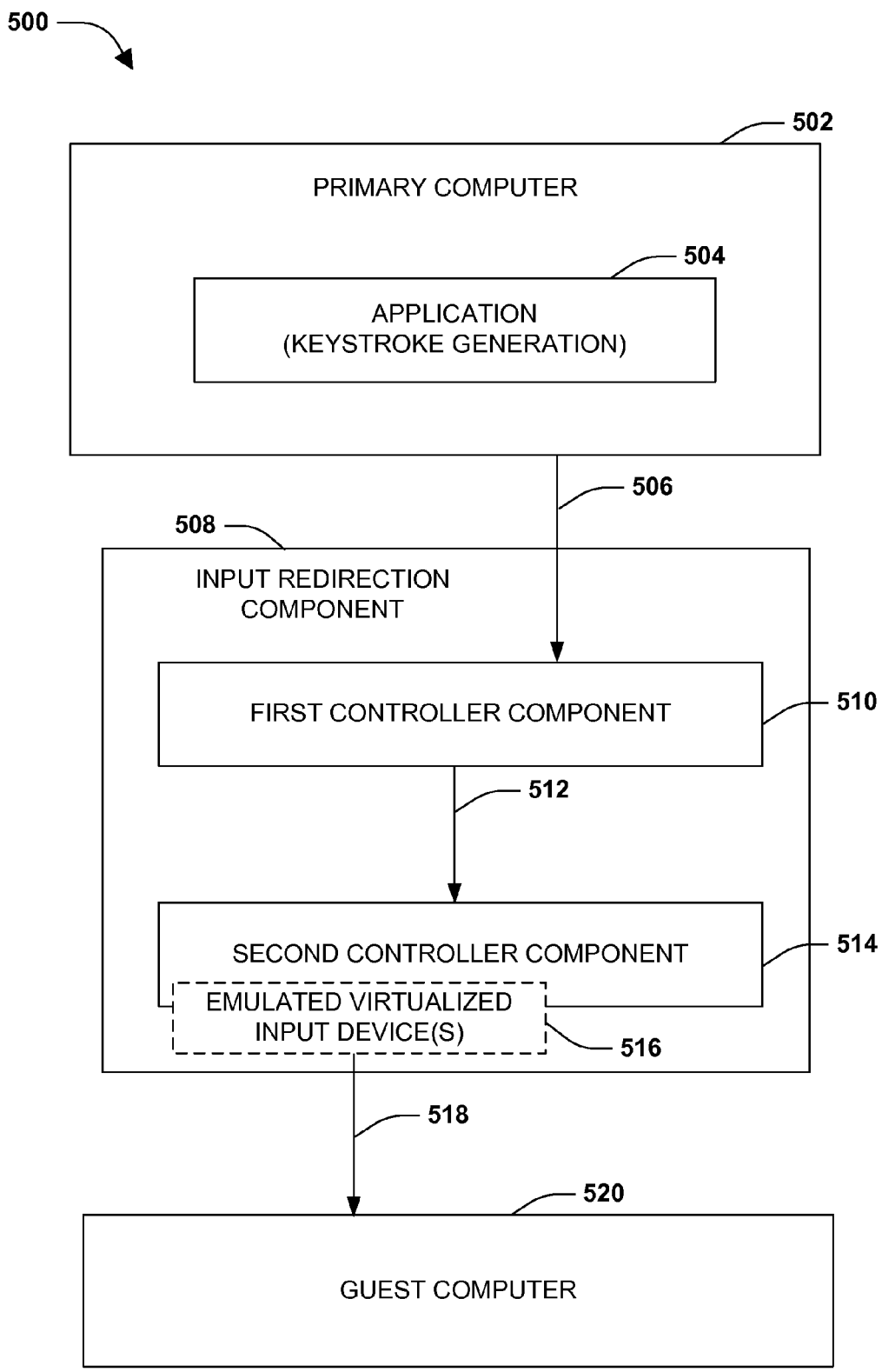
FIG. 5 is a component block diagram illustrating an exemplary system for providing emulated input signals to a guest computer.

FIG. 5 illustrates an example of a system 500 for providing emulated virtualized input signals to a guest computer 520. The system 500 comprises an input redirection component 508. The input redirection component 508 comprises a first controller component 510 coupled to a primary computer 502 by a first communication channel 506. The primary computer 502 may host an application 504 configured to generate input signals corresponding to a virtual input device, such as a keyboard, emulated by the application 504 (e.g., a "virtualized" input signal such that the "virtualized" input signal appears to have come from an input device, but is actually generated by the application 504, for example). For example, the application 504 may generate a series of keystrokes that may be received by the primary computer 502 as an input signal. The first controller component 510 may be coupled to a second controller component 514, of the input redirection component 508, by a second communication channel 512. The guest computer 520 may not be communicatively coupled to the application 504, and thus the input signal may not be identifiable by the guest computer 520.

The first controller component 510 may be configured to receive a message, over the first communication channel 506, from the primary computer 502 (e.g., primary host firmware of the first controller component 510 may receive the message). The message may indicate that the input signal, received by the primary computer 502 from the application 504, is to be forwarded to the guest computer 520. The first controller component 510 may relay the message, over the second communication channel 512, to the second controller component 514 (e.g., the message may be relayed to guest firmware of the second controller component 514).

The second controller component 514 may identify a device type of the input device, such as a keyboard device type, based upon the message. The second controller component 514 may connect to the guest computer 520 as an emulation of the keyboard device type to appear as an emulated input device 516, such as an emulation of a keyboard that appears to the guest computer 520 as being connected to the guest computer 520 over a third communication channel 518 between the second controller component 514 and the guest computer 520. The second controller component 514 may be configured to emulate the input device, to the guest computer 520, as the emulated input device 516. The second controller component 514 may provide an emulated input signal, as an emulation of the input signal, to the guest computer 502 over the third communication channel 518. In this way, the emulated input signals of the keyboard may be provided, over the third communication channel 518, to the guest computer 520.

According to an aspect of the instant disclosure, a system for providing an emulated input signal to a guest computer is provided. The system includes an input redirection component comprising a first controller component and a second controller component. The first controller component is coupled to a primary computer by a first communication channel. The first controller component is coupled to the second controller component by a second communication channel. The primary computer is coupled to an input device. The first controller component is configured to receive a message, over the first communication channel, from the primary computer. The message indicates that an input signal, received by the primary computer from the input device, is to be forwarded to a guest computer. The guest computer is not coupled to the input device. The first controller component is configured to relay the message, over the second communication channel, to the second controller component. The second controller component is coupled to the guest computer by a third communication channel. The second controller component is configured to generate an emulated input signal based upon the message relayed by the first controller component to the second controller component. The emulated input signal is formatted to appear as though the input signal originated form an emulated input device coupled to the guest computer over the third communication channel. The second controller component is configured to provide the emulated input signal, over the third communication channel, to the guest computer.

According to an aspect of the instant disclosure, a method for providing an emulated input signal to a guest computer is provided. The method includes establishing a first communication channel with an input device coupled to a primary computer. An input signal is received, over the first communication channel, from the input device. A second communication channel is established with an input redirection component. A message is sent, over the second communication channel, to the input redirection component. The message instructs the input redirection component to emulate the input device, to a guest computer, as an emulated input device. The message instructs the input redirection component to provide an emulated input signal, as an emulation of the input signal, to the guest computer over a third communication channel between the input redirection component and the guest computer.

According to an aspect of the instant disclosure, a computer readable medium, comprising instructions which when executed perform a method for providing an emulated input signal to a guest computer, is provided. The method includes establishing a first communication channel with a primary computer coupled to an input redirection component. A second communication channel is established between the input redirection component and a guest computer. A message is received, over the first communication channel, from the primary computer. The message indicates that an input signal, received by the primary computer from an input device coupled to the primary computer, is to be forwarded to the guest computer. The guest computer is not coupled to the input device. An emulated input signal is generated based upon the message. The emulated input signal is formatted to appear as though the input signal originated from an emulated input device coupled to the guest computer. The emulated input signal is provided, over the second communication channel, to the guest computer.

According to an aspect of the instant disclosure, a means for providing an emulated input signal to a guest computer is provided. An input redirection component comprises a first controller component and a second controller component. The first controller component is coupled to a primary computer by a first communication channel. The first controller component is coupled to the second controller component by a second communication channel. The primary computer is coupled to an input device. A message is received, over a first communication channel, from the primary computer, by the means for providing an emulated input signal. The message indicates that an input signal, received by the primary computer from the input device, is to be forwarded to a guest computer. The guest computer is not coupled to the input device. The message is relayed, over the second communication channel, to the second controller component, by the means for providing an emulated input signal. The second controller component is coupled to the guest computer by a third communication channel. An emulated input signal is generated based upon the message relayed, by the means for providing an emulated input signal. The emulated input signal is formatted to appear as though the input signal originated form an emulated input device coupled to the guest computer over the third communication channel. The emulated input signal is provided, over the third communication channel, to the guest computer, by the means for providing an emulated input signal.

According to an aspect of the instant disclosure, a means for providing an emulated input signal to a guest computer is provided. A first communication channel is established with an input device coupled to a primary computer, by the means for providing an emulated input signal. An input signal is received, over the first communication channel, from the input device, by the means for providing an emulated input signal. A second communication channel is established with an input redirection component. A message is sent, over the second communication channel, to the input redirection component, by the means for providing an emulated input signal. The message instructs the input redirection component to emulate the input device, to a guest computer, as an emulated input device. The message instructs the input redirection component to provide an emulated input signal, as an emulation of the input signal, to the guest computer over a third communication channel between the input redirection component and the guest computer.

According to an aspect of the instant disclosure, a means for providing an emulated input signal to a guest computer is provided. A first communication channel is established with a primary computer coupled to an input redirection component. A second communication channel is established between the input redirection component and a guest computer, by the means for providing an emulated input signal. A message is received, over the first communication channel, from the primary computer, by the means for providing an emulated input signal. The message indicates that an input signal, received by the primary computer from an input device coupled to the primary computer, is to be forwarded to the guest computer. The guest computer is not coupled to the input device. An emulated input signal is generated based upon the message, by the means for providing an emulated input signal. The emulated input signal is formatted to appear as though the input signal originated from an emulated input device coupled to the guest computer. The emulated input signal is provided, over the second communication channel, to the guest computer, by the means for providing an emulated input signal.

Figure 6:
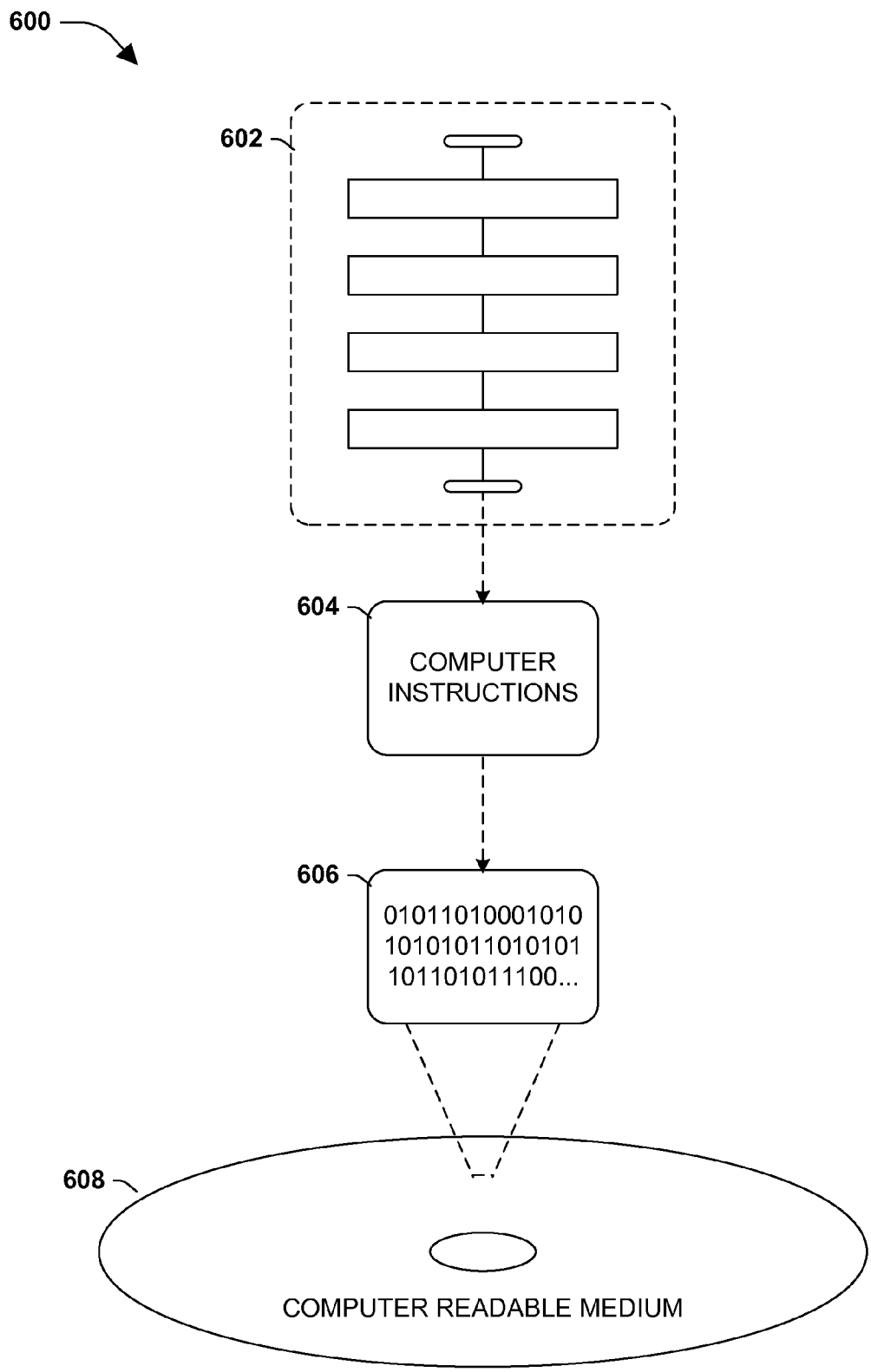
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1 and/or at least some of the exemplary method 200 of FIG. 2, for example. In some embodiments, the processor-executable instructions 604 are configured to implement a system, such as at least some of the exemplary system 300 of FIG. 3, at least some of the exemplary system 401 of FIGS. 4A-4C, and/or at least some of the exemplary system 500 of FIG. 5, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
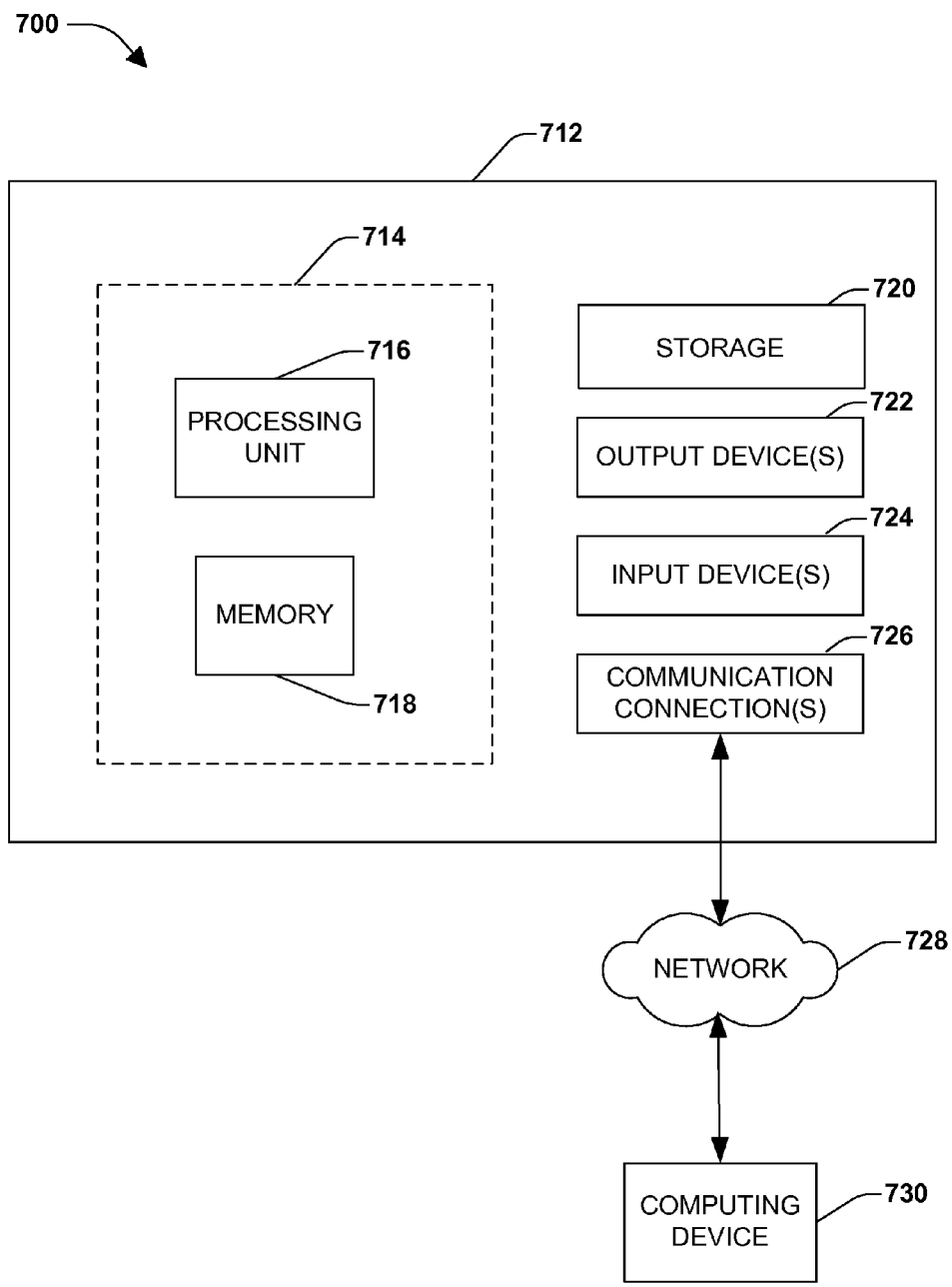
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for providing an emulated input signal to a guest computer connected to a display by a video connection which does not support input signals associated with the display to be transmitted to the guest computer, the system comprising:
  an input redirection component comprising a first controller component and a second controller component,
  the first controller component coupled to a primary computer by a first communication channel, the primary computer associated with the display that receives and displays video from the guest computer, and the primary computer coupled to an input device, and the first controller component coupled to the second controller component by a second communication channel, the first controller component configured to:
receive a message, over the first communication channel, from the primary computer, the message indicating that an input signal, received by the primary computer from the input device, is to be forwarded to the guest computer, the guest computer not coupled to the input device and the guest computer connected to the display by the video connection which does not allow input signals from the input device to be transmitted to the guest computer; and
relay the message, over the second communication channel, to the second controller component; and
the second controller component coupled to the guest computer by a third communication channel, the second controller configured to:
generate an emulated input signal based upon the message relayed by the first controller component to the second controller component, the emulated input signal formatted to appear as though the input signal originated from an emulated input device coupled to the guest computer over the third communication channel; and
provide the emulated input signal, over the third communication channel, to the guest computer which is connected to the display by the video connection which does not allow input signals from the input device to be transmitted to the guest computer;
wherein at least one of the first communication channel, the second communication channel, and the third communication channel comprises a bi-directional communication channel.

2. The system of claim 1, the input device not identifiable by the guest computer.

3. The system of claim 1, the input device comprising at least one of a stylus, a touch device, a camera, a touch display, an eye tracking device, a keyboard, or a mouse.

4. The system of claim 1, at least one of the primary computer or the guest computer comprising at least one of an embedded computer within a touch display, a videogame console, a tablet, a laptop, a wearable device, a mobile device, a personal computer, or a kiosk.

5. The system of claim 1, the guest computer coupled to a display, associated with the primary computer, by a video communication channel.

6. The system of claim 1, the second controller component configured to:
generate the emulated input signal as an emulated signal appearing to have originated from a device comprising at least one of a universal serial bus human interface device or a wireless communication device; and
provide the emulated input signal to a device driver, corresponding to the device, hosted on the guest computer.

7. The system of claim 1, the second controller component configured to:
identify a device type of the input device; and
connect to the guest computer as an emulation of the device type to appear as the emulated input device.

8. The system of claim 1, comprising:
a video projection component, associated with the primary computer, configured to:
receive a video signal from the guest computer;
define a guest display region for a display associated with the primary computer;
format the video signal for the guest display region to create a guest interface; and
display the guest interface through the display.

9. The system of claim 8, the input redirection component configured to:
identify the input signal as an input associated with the guest interface.

10. The system of claim 8, the video projection component configured to display a primary interface, associated with the primary computer, concurrently with the display of the guest interface on the display, and the input redirection component configured to distinguish the input signal as being associated with the guest interface and not the primary interface.

11. A method for providing an emulated input signal to a guest computer connected to a display by a video connection which does not support input signals associated with the display to be transmitted to the guest computer, the method comprising:
establishing a first communication channel with an input device coupled to a primary computer, the primary computer associated with the display that receives and displays video from the guest computer, the guest computer connected to the display by the video connection which does not allow input signals from the input device to be transmitted to the guest computer;
receiving, by the primary computer over the first communication channel, an input signal from the input device;
establishing a second communication channel with an input redirection component;
sending a message, over the second communication channel, to the input redirection component, the message instructing the input redirection component to emulate the input device, to the guest computer, as an emulated input device and to provide an emulated input signal, as an emulation of the input signal, to the guest computer over a third communication channel between the input redirection component and the guest computer;
wherein at least one of the first communication channel and the second communication channel comprises a bi-directional communication channel.

12. The method of claim 11, comprising:
receiving a virtualized input signal from an application associated with the primary computer, the virtualized input signal corresponding to a virtualized input device emulated by the application; and
sending a second message, over the second communication channel, to the input redirection component, the second message instructing the input redirection component to emulate the virtualized input device, to the guest computer, as an emulated virtualized input device and to provide an emulated virtualized input signal, as an emulation of the virtualized input signal, to the guest computer over the third communication channel.

13. The method of claim 11, comprising:
receiving a video signal from the guest computer;
defining a guest display region for a display associated with the primary computer;
formatting the video signal for the guest display region to create a guest interface; and
displaying the guest interface through the display.

14. The method of claim 13, comprising:
displaying a primary interface, associated with the primary computer, concurrently with the display of the guest interface on the display; and
distinguishing the input signal as being associated with the guest interface and not the primary interface.

15. The method of claim 11, the input device not identifiable by the guest computer.

16. The method of claim 11, comprising:
generating the emulated input signal as an emulated signal appearing to have originated from a universal serial bus human interface device; and
providing the emulated input signal to a device driver, corresponding to the universal serial bus human interface device, hosted on the guest computer.

17. The method of claim 11, comprising:
identifying a device type of the input device; and
connecting to the guest computer as an emulation of the device type to appear as the emulated input device.

18. A computer program product comprising one or more computer readable hardware storage devices comprising instructions which when executed perform a method for providing an emulated input signal to a guest computer connected to a display by a video connection which does not support input signals associated with the display to be transmitted to the guest computer, the method comprising:
establishing a first communication channel with a primary computer coupled to an input redirection component;
establishing a second communication channel between the input redirection component and the guest computer, the guest computer connected to the display by the video connection which does not allow input signals from an input device to be transmitted to the guest computer;
receiving a message over the first communication channel from the primary computer, the message indicating that an input signal, received by the primary computer from the input device coupled to the primary computer, is to be forwarded to the guest computer, the guest computer not coupled to the input device;
generating an emulated input signal based upon the message, the emulated input signal formatted to appear as though the input signal originated from an emulated input device coupled to the guest computer; and
providing the emulated input signal, over the second communication channel, to the guest computer;
wherein at least one of the first communication channel and the second communication channel comprises a bi-directional communication channel.

19. The computer program product of claim 18, comprising:
identifying a device type of the input device; and
connecting to the guest computer as an emulation of the device type to appear as the emulated input device.

* * * * *